US006047889A

United States Patent [19]

Williams et al.

[11] Patent Number: 6,047,889

[45] Date of Patent: Apr. 11, 2000

[54] FIXED COMMERCIAL AND INDUSTRIAL SCANNING SYSTEM

[75] Inventors: Kevin J. Williams; Robert F. Kortt, both of Eugene, Oreg.; Brian D. Peavey, Kuna, Id.; Thomas E. Tamburrini, Eugene, Oreg.

[73] Assignee: PSC Scanning, Inc., Eugene, Oreg.

[21] Appl. No.: 09/010,325

[22] Filed: Jan. 21, 1998

Related U.S. Application Data

[63] Continuation of application No. 08/659,982, Jun. 7, 1996, abandoned.

[60] Provisional application No. 60/000,067, Jun. 8, 1995.

[51] Int. Cl.[7] .......... G06K 15/00

[52] U.S. Cl. .......... 235/383; 235/462.13

[58] Field of Search .......... 235/383, 385, 235/380, 462.13; 209/554, 564, 583, 698, 559

[56] References Cited

U.S. PATENT DOCUMENTS

| | | | |
|---|---|---|---|
| 3,059,112 | 10/1962 | Rogal | 250/71 |
| 4,558,212 | 12/1985 | Hampson | 235/383 |
| 4,832,204 | 5/1989 | Handy et al. | 235/385 X |
| 5,019,694 | 5/1991 | Collins, Jr. | 235/383 |
| 5,177,345 | 1/1993 | Baitz | 235/462 |
| 5,463,213 | 10/1995 | Honda | 235/468 |
| 5,475,207 | 12/1995 | Bobba et al. | 235/467 |
| 5,600,121 | 2/1997 | Kahn et al. | 235/472 |
| 5,723,852 | 3/1998 | Rando | 235/467 |

*Primary Examiner*—Karl D. Frech
*Attorney, Agent, or Firm*—Lyon & Lyon LLP

[57] ABSTRACT

A package sorting and/or tracking system or workstation including a high performance data reader or barcode scanner, a real time system control computer, user interface devices, a superstructure to which all hardware is attached providing hands-free scanning operation at each work station, and a real-time communication link with the host computer system for transferring information scanned from the parcels or configuring the scanning system with up-to-the minute routing information. A scale system weighs each parcel to assure compliance to specifications. An optional feedback system to error-proof the sorting operation whereby the scanning system is configured with a sensing device on each of the bins to which a parcel may be sorted. Based on the tracking information read from the barcode label and the routing information provided by the host computer system, the scanning system instructs the operator to place the parcel in a particular bin. The sensing device on the bin determines if the parcel was placed into the correct bin. If a parcel is placed in the wrong bin, the operator is instructed to remove the parcel and re-sort it.

29 Claims, 5 Drawing Sheets

FIXED COMMERCIAL AND INDUSTRIAL SCANNING SYSTEM

RELATED APPLICATION DATA

This application is a continuing of application Ser. No. 08/659,982 filed Jun. 7, 1996, abandoned, which claims priority to provisional application Ser. No. 60/000,067 filed Jun. 8, 1995.

BACKGROUND OF THE INVENTION

The field of the present invention relates to a package tracking and/or sorting system using a barcode scanning system, or more particularly to the use of a fixed barcode scanning system for package tracking and/or sorting in the commercial and industrial market. This system would typically be found in a warehouse-like environment, where parcels are routed for consolidation or distribution. The scanning system is operator-assisted and designed to collect barcode information from each individual parcel, provide feedback to the operator which directs their next operation, and communicate tracking and routing information with a host computer system.

There are several methods currently in use for tracking and sorting parcels in the commercial and industrial industry. One method is a handheld scanning device that is electrically cabled to a portable data terminal (PDT). Each operator wears a PDT and carries with them and a scanning device. The operator is required to scan the parcel with one hand, then set the scanning device down, and perform the next operation. Then the tracking information is sent to, and collected in, the PDT. This information is then up-loaded to a host computer system when the PDT is deposited in a docking station, which typically occurs at the end of a shift. Also, information which the host has down-loaded into the PDT for sorting purposes can only happen when the terminal is docked. Therefore, an operator's PDT may not contain updated information required to correctly sort the parcels. Moreover, these systems do not have any provisions to let the operator know that the parcel has been sorted into the correct container for distribution or consolidation. Moreover, these systems may have reliability problems because of the abusive environment in which they operate and the high level of handling that is required to use them. Also, parcel through-put tends to be low, due to the scanning performance of the scanning device and the rate that the operator can move parcels, recognizing that the operator must handle the scanning device.

Another method which is employed comprises an automated scanning system in which a high performance scanning device is mounted above a parcel transport system, often a conveyer belt or system of belts. The scanning system collects the tracking information, reports it to the host computer system and automatically routes the parcel through a complex series of diverters. By the time the operator loads the parcel into a destination container, the tracking information has already been collected and reported to the host. This system is very capital intensive, and requires a good deal of maintenance. Moreover, the system lacks the flexibility often required for system reconfiguration or parcel re-routing based on changes in distribution plans.

SUMMARY OF THE INVENTION

The present invention relates to providing a system and method which overcomes disadvantages of the devices mentioned above, and provides other competitive functions and features. The scanning system is comprised of a high performance data reader or barcode scanner, a real time system control computer, user interface devices and preferably a superstructure to which all hardware is attached. The scanning system is intended to be operator-assisted and is preferably mounted to the superstructure providing hands-free scanning operation at each work station. The system may also include a real-time communication link with the host computer system for transferring information scanned from the parcels to the memory in the host computer system to update tracking information stored therein or for configuring the scanning system with up-to-the minute routing. The system may be networked to the host directly or via a wireless link. The scanning system may optionally be equipped with a scale system to weigh each parcel to assure compliance to specifications.

Another option of the system is an addition of a feedback system to error-proof the sorting operation whereby the scanning system is configured with a sensing device on each of the bins to which a parcel may be sorted. Based on the tracking information read from the barcode label and the routing information provided by the host computer system, the scanning system instructs the operator to place the parcel in a particular bin. The sensing device on the bin determines if the parcel was placed into the correct bin. If a parcel is placed in the wrong bin, the operator is instructed to remove the parcel and re-sort it. Other options of the system are the functions available through the user interface devices, key pad and multi-line display. In such a system, the operator can input his ID number, configure the system for operation, modify downloaded host configuration information, check system performance, or perform system maintenance and system diagnostic checks.

DETAILED DESCRIPTION OF THE PREFERRED EMBODIMENTS

The preferred embodiments of the present invention will now be described with respect to the drawings. To facilitate the description, any numeral identifying an element in one figure. will represent the same element when used in any other figure.

Figure 1:
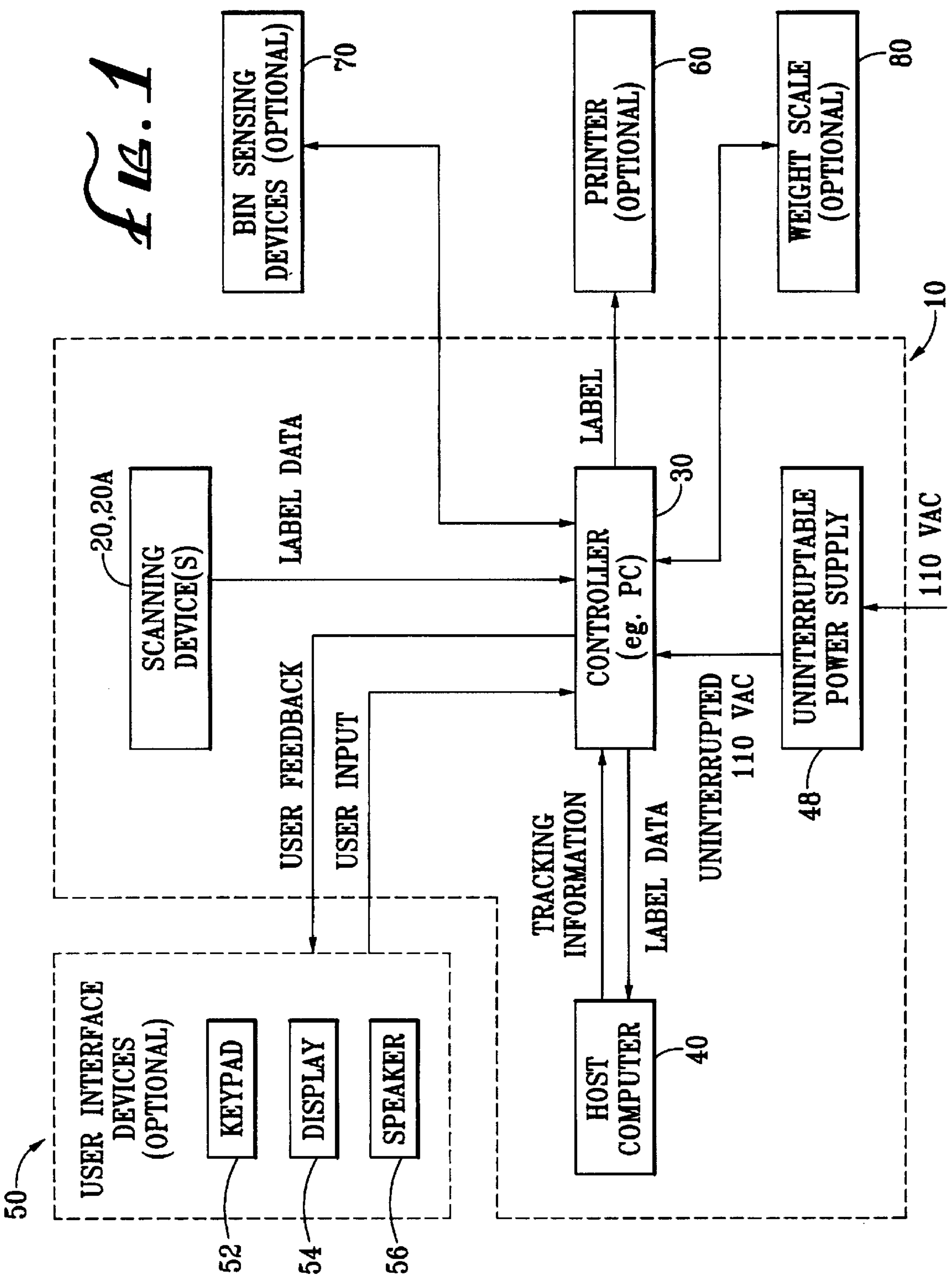
FIG. 1 is a schematic of a sorting/tracking system according to a preferred embodiment of the present invention.
Figure 2:
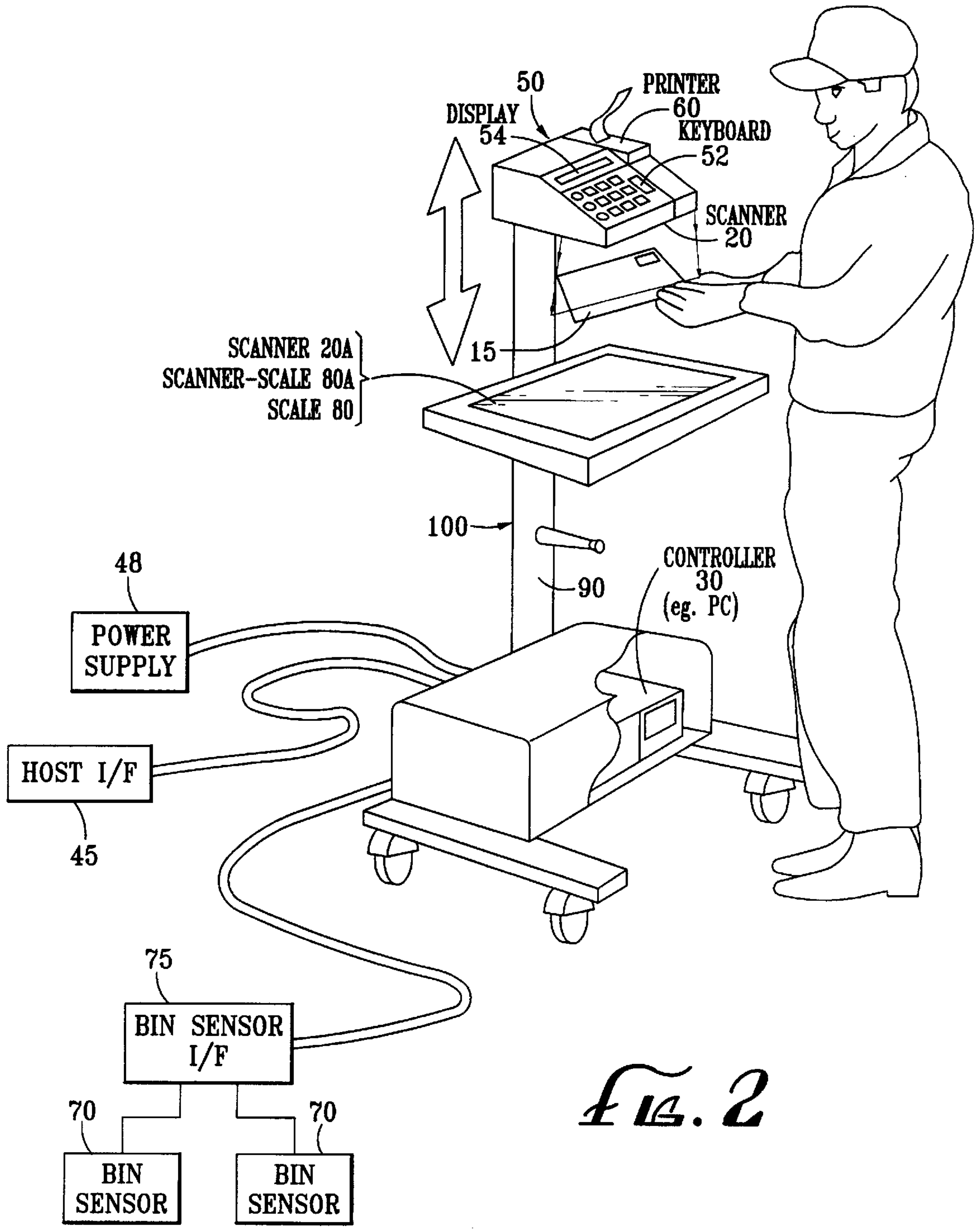
FIG. 2 is partly diagrammatic representation of the system of FIG. 1.
Figure 4:
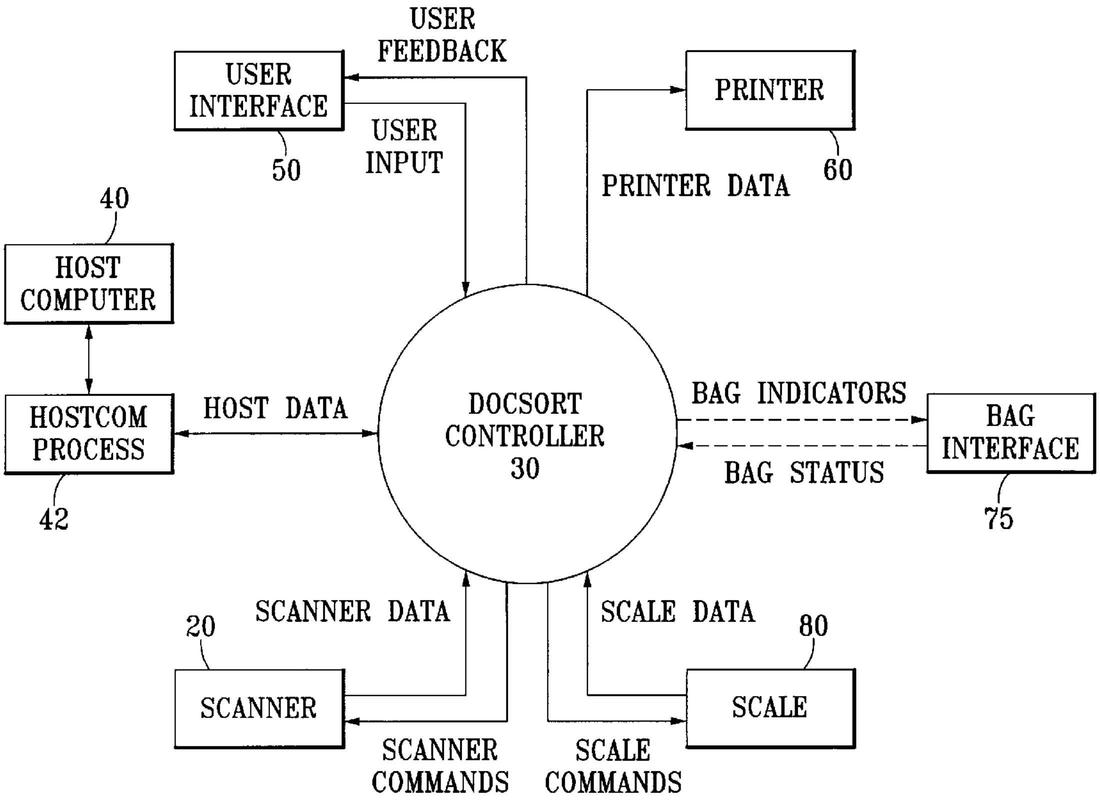
FIG. 4 is a schematic of the system of FIG. 1.

In its preferred embodiment as shown in FIGS. 1, 2, and 4 the scanning system is part of a computer based system for sorting and tracking parcels. The sorting and tracking system 10 includes a scanning device 20 which communicates to a host computer 40 via a controller 30. The system 10 is designed to aid an operator in sorting parcels into the proper destination bins by error proofing the sorting process. Each system may include a controller 30, scanner 20, scale 80 (which may be combined as a scanner/scale 20A/80A), printer 60, multi-line display 54, key pad 52, free standing support structure 90 and one or more bin sensors connected through bin sensor interface 75. The controller 30 may comprise a PC or other suitable processor-based controller, such as the current Motorola 68XXX family or the DEC Alpha, which may support a real time multi-tasking operating system. Running under a real-time, multi-tasking operating system such as QNX or UNIX, the dedicated controller 30 is used as the system controller to interface to scanner/scale 20/80, barcode printer 60, multi-line display 54, key pad 52, the bag or bin sensors 70, and the host computer system 40. The system may be configured for operation by the operator, or from a remote location via the host network. Once the system is configured, the operator uses the barcode scanner 20 (which may comprise a laser scanner, CCD-type imaging scanner, or other suitable reader) to obtain barcode label information from each parcel. Based on the tracking information obtained, the system controller 30 signals the operator as to the appropriate bin in which to place the parcel 15 (such as a document pack) by activating a light over that bin. The sensor 70 at the bin (via the bin sensor interface 75) will determine if the parcel 15 was placed into the correct bin and signals the user with applicable confirmation, as further described below.

The scanning system is preferably made up of a number of specialized hardware sub-systems which will now be described. In the preferred embodiment, there are eight basic sub-systems to the design, which may include: a) Controller 30 (e.g. a PC or other microprocessor-based controller), b) an overhead Barcode Scanner 20 and an upwardly facing scanner 20A, c) Weigh Scale 80, d) Barcode Printer 60, e) User Interface 50 (which may include both the Display 54, Keyboard 52, and Speaker 56), f) Power Distribution/Supply 48, g) Enclosure System 100, and h) Bin Sensors 70. Preferably, the weigh scale 80 is combined as a scanner/scale with the upwardly facing scanner 20A.

The System Controller: The system controller 30 may be comprised of an industry standard computer such as the model AT, which can be purchased easily from a variety of sources. Preferably, the system 10 may use the computer "as is" from the supplier, without any additional enhancements for the industrial environment. Using a standard PC as a system controller helps keep the overall cost of the system low. Other, more expensive computer systems could be used as the system controller, depending upon the customer application, but for most applications it is anticipated that a standard PC will provide adequate system performance. All of the other electronic sub-systems would interface to the computer and their potential interface types are listed in this section. At the current level of computer hardware technology, the following system specifications may be applicable:

- Minimum of a 80-386 CPU with two ISA bus expansion slots.
- RAM installed as required, but 4 Mbytes will most likely be enough.
- Hard drive, standard SCSI or IDC interface, size to depend upon programming requirements.
- Interface Requirements
  - Scanner 20 (RS-232)
  - Scale 80 (RS-232 with no direct connection to controller 30; connected through scanner 20)

Keypad 52 (Standard keyboard interface)
Display 54 (EGA, VGA of SVGA)
Printer 80 (RS-232)
Bag Stand 78 (RS-485)
Power Supply 48 (110 Volt AC)
Ethernet Host Port 45

It will be understood that over time, "industry standard" computer technology for the controller 30 will advance such that the computer hardware described above will be considered obsolete, but the system described as an example which may be upgraded to encompass current computer technology.

Barcode Scanner(s): For the typical package handling environment, such as Federal Express or United Parcel Service, the scanner 20 would preferably be omnidirectional and, under current technology, diode laser-based, but a CCD imaging type could also be used as technology permits.

In a first embodiment using a single upper scanner, the scan pattern would be produced by a "down facing" scanner 20 and require that the operator position the barcode label facing up towards the scanner 20. A "down facing" scanner may comprise a single window (horizontal, down-facing) scanner such as the Spectra-Physics SP*ACE scanner. Such a scanner includes a scan head whose direction is adjustable (rotatable) to improve scanner orientation as desired.

Alternately, the scanner 20 may comprise one or more horizontal windows with one or more scan patterns being projected into the scan volume therebelow. In that configuration, the scanner 20 may comprise both a horizontal and a vertical window of a multiple window ("L") design such as the Spectra-Physics Magellan™ scanner of the type disclosed in U.S. Pat. No. 5,475,207, herein incorporated by reference, or an upside down "U" design, such as a tunnel scanner. In the present application, the scanner 20 would be inverted with the horizontal window placed over the scan volume and "down facing" (i.e. an overhead scanner configuration) and with the vertical window facing the scan volume from a side opposite the user.

Another configuration for the overhead scanner 20 may comprise an integrated scanner unit such as the Spectra-Physics Magellan™ scanner, configured with two horizontal windows instead of the "L" shape (or just one large horizontal window) with the multiple beams being directed to opposite sides of the polygon mirror to direct a scan pattern through each window. The pattern mirror array for each window may be similar to the pattern mirror array about the horizontal window of the Magellan™ scanner, the respective patterns being mirror images of each other. Such a scanner would produce a highly efficient and dense scan pattern. The multiple laser reading beams may be generated, for example, by separate laser diodes or by a single diode and a beam splitter.

Since the upper scanner 20 cannot read a bar code placed facing downward onto the weigh scale, the system scanner may additionally (or alternately) also comprise a lower scanner 20A comprising a similar configuration to any of those described above with respect to the upper scanner 20, except the horizontal window is upwardly facing. The upwardly facing scanner 20A should permit focused scanning right at the window surface since the user may scan right at the surface of the scanner 20A. Moreover, the window, or its surface coating, should be scratch-resistant since the user may drag items across the window. In contrast, the upper scanner 20 may be focused for distances further from the window surface (e.g. in a range from 5 inches out to the surface of the scale 80), and the window need not be scratch-resistant since the user will less likely drag objects across the upper window.

The scanner may have the following attributes:

The scanner 20/20A may be configured to read one of a multiple of code types available. Auto discrimination of code types could be done, but would not be preferred.

Label assembly or stitching could be enabled when required.

Depth of field or read zone could be from 0 inch to 24 inches off the weigh platter surface.

Scan optics would be resistant to dust and liquid spills to meet the demands of the environment.

Weigh Scale: The intent is to use the Spectra-Physics Magellan™ scale module as it presently exists with a weigh platter and interface all communication through the scanner. The scale module 80 is preferably a stand alone scale device which communicates with the Magellan™ scanner 20 digital electronics. The scale 80 may have the following attributes:

Scale is approved to trade in the applicable application.

Weight range: 0–75 lbs.

Static overload protection of 250 lb.

Alternately the lower section below the upper scanner 20 may comprise a lower scanner 20A, a scanner-scale 80A, or merely a scale module 80. The system may include a lower scanner 20A in addition or in place of the upper scanner 20, the scale may be integrated with a scanner to comprise an integrated scanner-scale 80A such as in the Magellan™ scanner/scale or as in the system described in U.S. Pat. No. 5,410,108 herein incorporated by reference.

Barcode Printer: An optional printer 60 may be configured with the system for the purposes of generating barcode labels or outputting a hard copy of the scanned tracking information or system configuration. Communication may be provided via its RS-232 port to the system controller. FIG. 2 illustrates provision of an enclosure system for mounting the printer 60 comprised of an integrated user interface 50 and printer 60.

User Interface: The user interface 50 is comprised of three major components: 1) display 54; 2) key pad 52; and 3) sound indicator/speaker 56. All of these components may be mounted in the upper portion of the enclosure system 100 and support structure 90 with the barcode scanner 20 as shown in FIG. 2. The system may also include a pointing device such as an LED array in conjunction with one or more lenses to project a visible spot through the center of the scan pattern. This visible spot will indicate to the operator where the scan pattern is and where to place the code label when scanning.

Following is an example system setting forth suggested minimum requirements for each of the components:

1. Display: Multi-line, minimum of 1 or more lines, with one line dedicated for weight information and operator ID number; standard interface type; Optional—LED Pointer
2. Key pad: 13 keys, with dedicated 0–9 keys. Interface would be compatible with standard PC keyboard interfaces. Keys would require a bare, (non-gloved) hand to operate.
3. Speaker: Voice coil Speaker or Piezo transducer. Used for good scan indicator and potential other functions. Sound level of 68 dba at 1 meter.

Power Supply/Distribution: Input power would preferably be via standard 110 volt AC at 60 hz. The internal AC to DC power supply will convert the 110 volt AC into the required DC levels and will provide power to all electronics subassemblies as well as to the bag stands. It is recommended that an un-interruptable power supply (UPS) be configured with every system to insure data integration during power surges and power failures.

Enclosure System: The enclosure system 100 is intended to be a fabricated structure to which all of the other subsystems mount or attach (see FIG. 2). Near the base of the structure, a bulkhead could be incorporated for power input and bag sensor interfacing. Internal to the base of the enclosure system 100 is mounted the system controller 30, UPS and power supply 48. The center pole of the support structure 90 will allow for cable routing between the controller 30 and the various other subsystems with which it will integrate. The support structure 90 is preferable a free standing assembly upon which the components of the system 10 are mounted. The scale platter 80 could be mounted above the base at a fixed distance from the floor or be adjustable by the user. The barcode scanner 20 would be housed in the top enclosure with the user interface components and could be made to adjust vertically to configure the system for various parcel sizes.

Bin Sensor: The bin sensor 70 provides two key functions to the scanning system: 1) visual indication for desired bin destination for the scanned parcel, and; 2) feedback mechanism for error proofing the sorting process. In one embodiment as in FIG. 3B, the visual indication for bin location of the scanned parcel may be achieved by lighting an indicator light 74, such as an LED array, that is attached to the top of the sensor 70. The feedback mechanism for error proofing the sort process is achieved with an infrared light curtain 72 which is designed into the bin sensor 70.

Figure 3A:
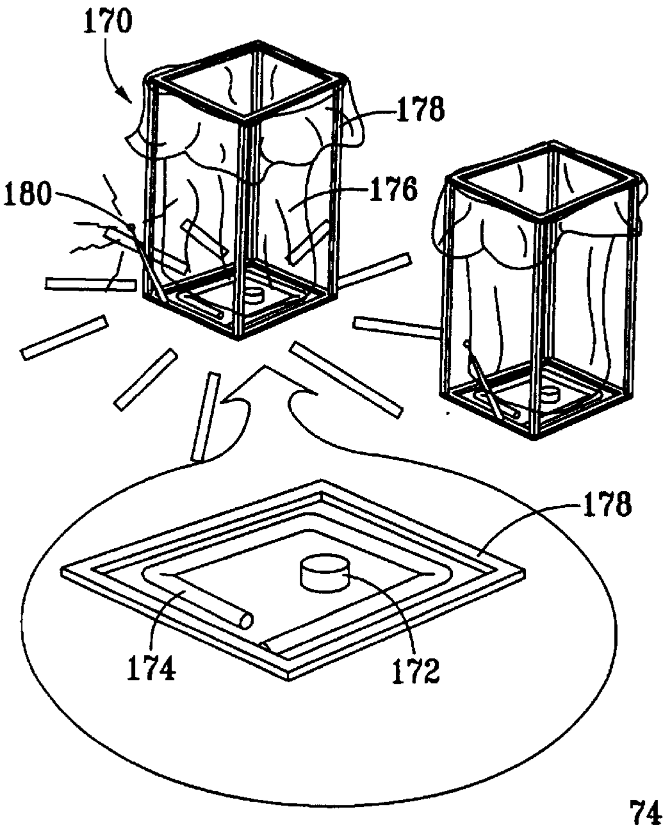
FIG. 3A illustrates the package bin with a bin sensor comprising a weigh sensor configuration.
Figure 3B:
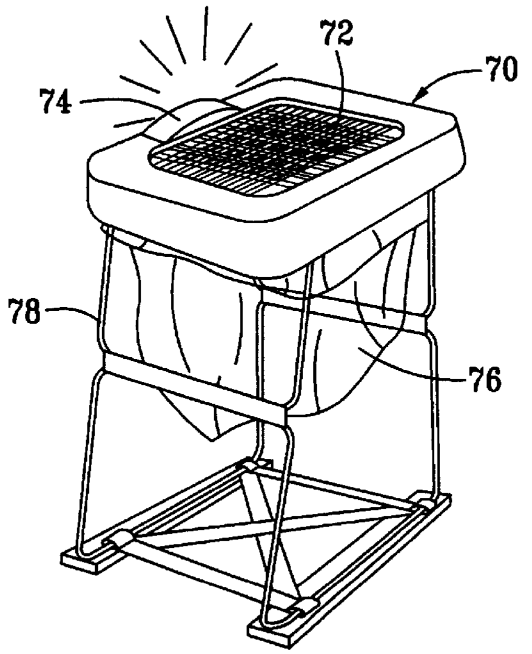
FIG. 3B illustrates the package bin with a bin sensor comprising a light curtain configuration.

FIG. 3A illustrates an alternative bin sensing approach in which the presence of a parcel is detected by sensing a change in weight of the bin 170. This alternative employs a scale-like device, such as load cell 172, as part of the sensing system for each bin 170. When the system determines the proper bin location for a parcel that has been scanned, the controller 30 signals the appropriate bin which activates indicator light 174. When a parcel is placed in the bag 176 of the bin 170, the load cell 172 detects a change in total weight of the parcels and the bag 176 thereby confirming that a parcel has been placed therein in the bin 170. A single load cell 172 may be placed under the bag 176, or the bag stand 178 may be placed on a platter or a plurality of load cells. Provided the weigh scale of the bin sensor 170 is sufficiently precise, the change in weight of the bin can be used to estimate the weight of the parcel itself, and provided the system also includes parcel weight information, the system can also confirm that the correct parcel has been placed in the bin.

Communication to the bins may be made over wire connection, or alternately wireless communication using RF antenna 180 or some other suitable transmission method.

The following list describes the features and assumptions of the bin sensor:

A bin sensor will be associated with one open bin.

Bin sensors can be daisy chained together with up to several hundred bins configurable at any on time.

Each sensor can be located anywhere in the chain, but may require configuration setting.

Each sensor will incorporate an indicator light which is visible omni-directionally around the stand.

Light functions include

- Light Off
- Light ON (Green)
- Light FLASH (Alternate color, such as amber, preferred) for indicating incorrect parcel placement for example.
- Report item passed through light curtain to controller.
- Address selection/acknowledge to computer.

Quick connect/disconnect cable between main system and each bin sensor.

I/F would allow for plugging and unplugging any bin sensor, whether power is applied.

Figure 5:
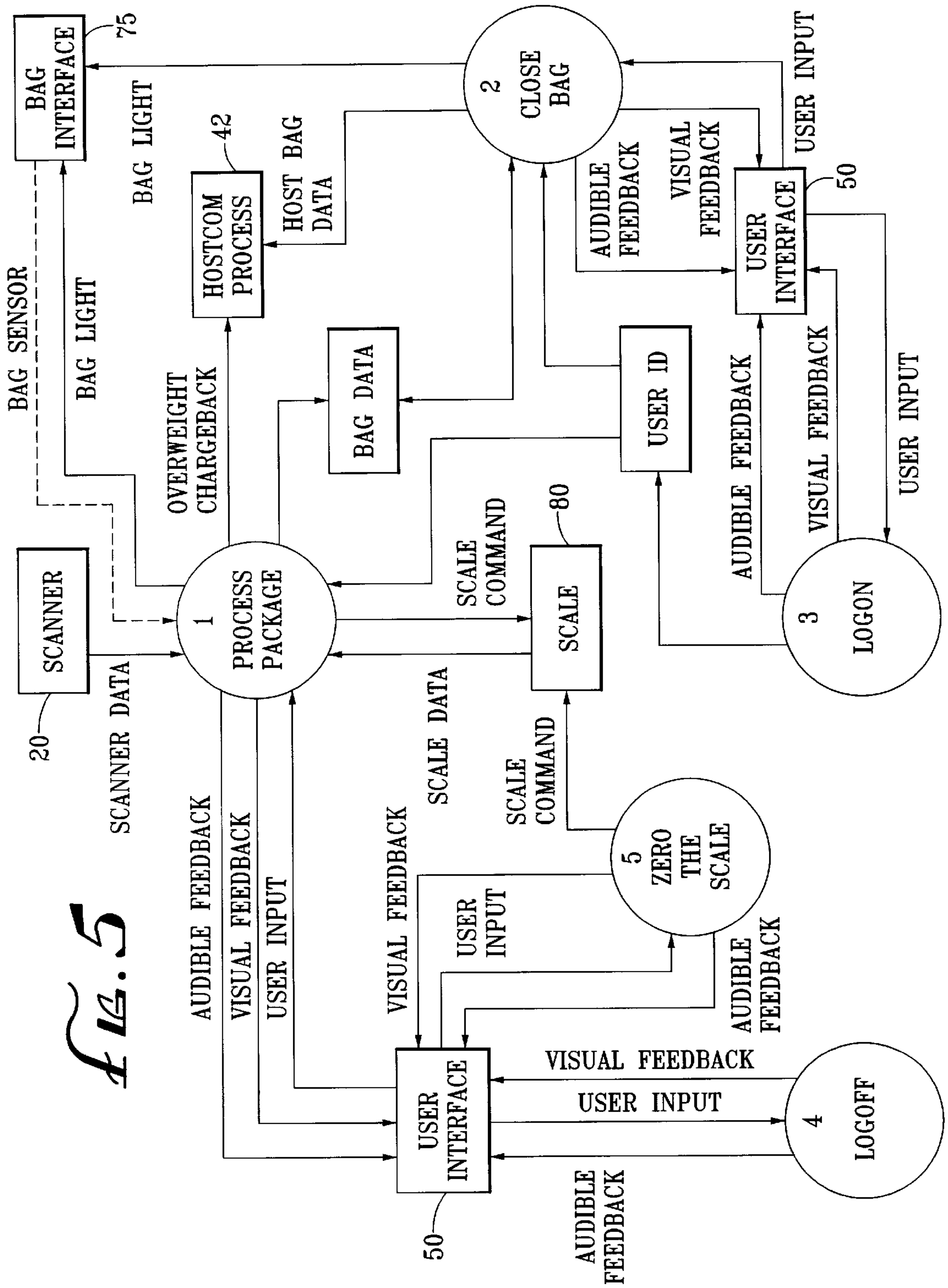
FIG. 5 is a flow chart of the software operation of the sorting/tracking system.

Software Sub-system: Scanning system software would reside on the controller 30 and may be developed under the QNX operating system. Drivers would be written to interface the scanner 20, scale 80, printer 60, and bag sensors 70 to the controller 30. A user interface may also be developed which allows the operator to invoke the functions required by the controller. All data destined for the host computer would be piped to a transaction application software program for host communication. This application is responsible for formatting all data and sending it to the host computer over a TCP/IP link which is available on the controller 30. The data flow diagram of FIG. 5 describes the high level operation of the Document Sort station's controller.

In Step 1: Process Package, the scanning system controller software will accept labels from parcels as they are scanned by scanner 20. The label would be verified based on tracking information downloaded from the host has loaded into the system, and an indicator (such as an indicator light) will be activated on the appropriate destination bin through the bag interface 75. When the parcel is placed in the correct bin, the indicator will be deactivated. When a bin is full, the operator will close a bin bag (Step 2: Close Bag) which causes a consolidation label to printed, which is then attached to the bin bag. The data for this bin bag would then be sent to the host computer 42. After scanning, the operator may optionally weigh the parcel on the scale 80. If it is overweight, an overweight charge-back record could be sent to the host computer 42. The processor or the host computer may have a memory (e.g. look-up table) of the weights of the parcels in the system which is used to compare the actual weight of the parcel against the weight limits of the set for particular charge rates. If the weight is over the standard weight, the charge-back record is sent to the host computer 42. The host computer is responsible for making any charge back determinations. Alternately, the parcel weight may be encoded into the code symbol itself.

Additionally, the system may also be provided with a means of recapturing lost profits when a parcel is out of spec due to weight. If the operator feels that a particular parcel is over the weight specification for the type of parcel, after scanning, the parcel can be placed on the scale. The weight of the parcel is then transmitted to the host computer and the system can automatically determine if the package was billed appropriately and invoke a charge-back, if required.

The system requires the operator to enter a User ID number in order to logon the system (Step 3: Logon) before scanning any parcel, and allows the user to log off (Step 4: Logoff) when there are no parcels in an open bin. The system may accommodate up to several hundred destination bins.

When one bag of parcels is removed and a new bag is installed on the bag stand, the operator reset the scale (Step 5: Zero The Scale) by resetting the scale indicating that there are no parcels in the bag.

Thus, an automated package sorting and/or tracking system as been shown and described. Though certain examples and advantages have been disclosed, further advantages and modifications may become obvious to one skilled in the art from the disclosures herein and the invention is not to be limited thereby except in the spirit of the claims that follow.

What is claimed is:

1. A package sorting and/or tracking workstation comprising a support structure;

a controller mounted on the support structure;

a scanner mounted on the support structure over a scan volume and connected to the controller, the scanner projecting a plurality of scan lines out of at least one window positioned in a horizontal down facing orientation over the scan volume;

a user interface mounted on the support structure;

connection to plurality of parcel bins disposed about the workstation and connected to the controller, wherein the workstation sends a signal to one of the parcel bins for providing instructions to an operator as to a proper destination for the parcel which has been scanned.

2. A workstation according to claim 1 further comprising a printer mounted on the support structure proximate the user interface.

3. A workstation according to claim 1 wherein the user interface comprises a key pad and display.

4. A workstation according to claim 1 wherein the support structure comprises a base and a center pole mounted to the base, the center pole extending vertically upward from the base.

5. A workstation according to claim 1 further comprising a scale mounted on the support structure below the scan volume.

6. A workstation according to claim 1 further comprising a lower scanner mounted on the support structure and connected to the controller, the scanner comprising at least one window positioned in a horizontal upward facing orientation projecting scanning beams into the scan volume thereabove.

7. A workstation according to claim 1 wherein the support structure includes wheels for allowing the workstation to be moved.

8. A package sorting and/or tracking workstation comprising a support structure;

a controller mounted on the support structure;

a scanner mounted on the support structure over a scan volume and connected to the controller, the scanner projecting a plurality of scan lines at least one window positioned in a horizontal down facing orientation over the scan volume;

a user interface mounted on the support structure;

connection to plurality of parcel bins disposed about the workstation and connected to the controller, each parcel bin having (a) means for indicating a proper destination for the parcel which has been scanned and (b) a bin sensor for sensing deposit of a parcel within the parcel bin;

a scale mounted on the support structure below the scan volume.

9. A package sorting and/or tracking workstation comprising a support structure;

a controller mounted on the support structure;

a scanner mounted on the support structure over a scan volume and connected to the controller, the scanner projecting a plurality of scan lines at least one window positioned in a horizontal down facing orientation over the scan volume;

a user interface mounted on the support structure;

connection to plurality of parcel bins disposed about the workstation and connected to the controller, each parcel bin having (a) means for indicating a proper destination for the parcel which has been scanned and (b) a bin sensor for sensing deposit of a parcel within the parcel bin;

a lower scanner mounted on the support structure and connected to the controller, the scanner comprising at least one window positioned in a horizontal upward facing orientation projecting scanning beams into the scan volume thereabove.

10. A package sorting and/or tracking workstation comprising a support structure;

a controller mounted on the support structure;

a scanner mounted on the support structure over a scan volume and connected to the controller, the scanner projecting a plurality of scan lines at least one window positioned in a horizontal down facing orientation over the scan volume;

a user interface mounted on the support structure;

connection to plurality of parcel bins disposed about the workstation and connected to the controller, wherein the support structure comprises a base and a center pole mounted to the base, the center pole extending vertically upward from the base, wherein the base includes wheels for allowing the workstation to be moved.

11. A package sorting and/or tracking workstation comprising a support structure;

a controller mounted on the support structure;

a scanner mounted on the support structure over a scan volume and connected to the controller, the scanner projecting a plurality of scan lines at least one window positioned in a horizontal down facing orientation over the scan volume;

a user interface mounted on the support structure;

connection to plurality of parcel bins disposed about the workstation and connected to the controller, each parcel bin having (a) means for indicating a proper destination for the parcel which has been scanned and (b) a bin sensor for sensing deposit of a parcel within the parcel bin, wherein the bin sensor comprises means for sensing a change in weight of the parcel bin.

12. A package sorting and/or tracking workstation comprising a support structure;

a controller mounted on the support structure;

a scanner mounted on the support structure over a scan volume and connected to the controller, the scanner projecting a plurality of scan lines at least one window positioned in a horizontal down facing orientation over the scan volume;

a user interface mounted on the support structure;

connection to plurality of parcel bins disposed about the workstation and connected to the controller, each parcel bin having (a) means for indicating a proper destination for the parcel which has been scanned and (b) a bin sensor for sensing deposit of a parcel within the parcel bin, wherein the bin sensor comprises a light curtain disposed over an entry to the parcel bin for detecting passage of a parcel therethrough.

13. A parcel sorting system comprising a workstation comprised of a controller, a scanner for scanning parcels presented thereto, the scanner being mounted adjacent a scan volume and connected to the controller, a user interface connected to the controller;

a plurality of parcel bins disposed about the workstation and connected to the controller, each parcel bin having (a) an indicator for providing instructions to an operator designating that bin as a proper destination for the parcel which has been scanned and (b) bin sensor for sensing deposit of a parcel.

14. A parcel sorting system according to claim 13 further comprising a printer mounted on the support structure proximate the user interface.

15. A parcel sorting system according to claim 13 wherein the user interface comprises a key pad and display.

16. A parcel sorting system according to claim 13 wherein the support structure comprises a base and a center pole mounted to the base, the center pole extending vertically upward from the base.

17. A parcel sorting system according to claim 13 wherein the workstation comprises a support structure having wheels for allowing the workstation to be moved.

18. A parcel sorting system according to claim 13 further comprising a scale mounted on the support structure below the scan volume.

19. A parcel sorting system according to claim 13 further comprising a lower scanner mounted on the support structure and connected to the controller, the scanner comprising at least one window positioned in a horizontal upward facing orientation projecting scanning beams into the scan volume thereabove.

20. A parcel sorting system according to claim 13 wherein the bin sensor senses a change in weight of the parcel bin.

21. A parcel sorting system according to claim 13 wherein the bin sensor comprises a light curtain disposed over an entry to the parcel bin for detecting passage of a parcel therethrough.

22. A parcel sorting system comprising a workstation comprised of a controller, a scanner for scanning parcels presented thereto, the scanner being mounted adjacent a scan volume and connected to the controller, a user interface connected to the controller, a scale mounted on the support structure below the scan volume; and a plurality of parcel bins disposed about the workstation and connected to the controller, each parcel bin having (a) means for indicating a proper destination for the parcel which has been scanned and (b) bin sensor for sensing deposit of a parcel.

23. A parcel sorting system comprising a workstation comprised of a controller, a scanner for scanning parcels presented thereto, the scanner being mounted adjacent a scan volume and connected to the controller, a user interface connected to the controller, a lower scanner mounted on the support structure and connected to the controller, the scanner comprising at least one window positioned in a horizontal upward facing orientation projecting scanning beams into the scan volume thereabove; and a plurality of parcel bins disposed about the workstation and connected to the controller, each parcel bin having (a) means for indicating a proper destination for the parcel which has been scanned and (b) bin sensor for sensing deposit of a parcel.

24. A parcel sorting system comprising a workstation comprised of a controller, a scanner for scanning parcels presented thereto, the scanner being mounted adjacent a scan volume and connected to the controller, a user interface connected to the controller; and a plurality of parcel bins disposed about the workstation and connected to the controller, each parcel bin having (a) means for indicating a proper destination for the parcel which has been scanned and (b) bin sensor for sensing deposit of a parcel, wherein the bin sensor comprises means for sensing a change in weight of the parcel bin.

25. A parcel sorting system comprising a workstation comprised of a controller, a scanner for scanning parcels presented thereto, the scanner being mounted adjacent a scan volume and connected to the controller, a user interface connected to the controller, a plurality of parcel bins disposed about the workstation and connected to the controller, each parcel bin having (a) means for indicating a proper destination for the parcel which has been scanned and (b) bin sensor for sensing deposit of a parcel, wherein the bin sensor comprises a light curtain disposed over an entry to the parcel bin for detecting passage of a parcel therethrough.

26. A method for sorting parcels comprising the steps of providing (a) a sorter workstation having a scanner and (b) a plurality of parcel bins disposed about the sorter workstation and connected to the controller;

presenting a parcel to a scanner;

scanning the parcel to obtain parcel identification;

obtaining destination information of the parcel on the basis of the parcel identification;

providing a visual indication at one of the parcel bins corresponding to the destination information obtained;

depositing the parcel in one of the parcel bins on the basis of the visual indication provided;

sensing the parcel being deposited in a parcel bin; and confirming that the parcel has been deposited in the parcel bin corresponding to the destination information previously obtained.

27. A method according to claim 26 wherein the step of sensing comprises sensing a change in weight of the parcel bin.

28. A method according to claim 26 wherein the step of sensing comprises providing a light curtain over an entry to the parcel bin which detects passage of a parcel therethrough.

29. A method according to claim 26 wherein the steps of presenting and scanning the parcel comprise providing the parcel with a label containing identification information;

employing a scanner positioned over the scan volume;

orienting the parcel to present the label in an upward orientation facing the scanner.

* * * * *